(12) United States Patent
Yoshikane et al.

(10) Patent No.: US 9,056,379 B2
(45) Date of Patent: Jun. 16, 2015

(54) POWER TOOL DUST COLLECTING DEVICE AND POWER TOOL

(75) Inventors: Kiyonobu Yoshikane, Anjo (JP); Yoshitaka Machida, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 224 days.

(21) Appl. No.: 13/567,476

(22) Filed: Aug. 6, 2012

(65) Prior Publication Data

US 2013/0055523 A1 Mar. 7, 2013

(30) Foreign Application Priority Data

Sep. 7, 2011 (JP) .................................. 2011-195275
Oct. 4, 2011 (JP) .................................. 2011-220373

(51) Int. Cl.
*A47L 5/24* (2006.01)
*A47L 9/10* (2006.01)
*B23Q 11/00* (2006.01)
*B28D 7/02* (2006.01)

(52) U.S. Cl.
CPC .............. *B23Q 11/0046* (2013.01); *B28D 7/02* (2013.01)

(58) Field of Classification Search
USPC ........ 15/347, 354, 412, 344, 350; 173/75, 78, 173/175, 198, 199; 451/456
See application file for complete search history.

(56) References Cited

U.S. PATENT DOCUMENTS

| | | | |
|---|---|---|---|
| 5,113,951 A * | 5/1992 | Houben et al. .................. 173/75 |
| 5,332,343 A * | 7/1994 | Watanabe et al. ............. 409/136 |
| 6,851,898 B2 * | 2/2005 | Ege et al. ......................... 408/67 |
| 6,887,146 B2 * | 5/2005 | Staas et al. ....................... 454/66 |
| 7,281,886 B2 * | 10/2007 | Stoerig ............................ 408/67 |
| 7,354,226 B2 * | 4/2008 | Britz ................................ 408/67 |
| 7,740,086 B2 * | 6/2010 | Bleicher et al. ............... 173/198 |

FOREIGN PATENT DOCUMENTS

| | | |
|---|---|---|
| DE | 10 2006 029 625 A1 | 1/2008 |
| DE | 10 2006 039 969 A1 | 2/2008 |
| EP | 0 295 225 A1 | 12/1988 |
| GB | 2 269 551 A | 2/1994 |
| JP | S5236702 U | 3/1977 |
| JP | S54144485 U | 10/1979 |
| JP | S5935493 U | 3/1984 |
| JP | S59191279 U | 12/1984 |
| JP | H06-179108 A | 6/1994 |
| JP | 2010-064199 A | 3/2010 |

OTHER PUBLICATIONS

European Search Report issued in Application No. 12179503.3; Dated Nov. 12, 2012.
Dec. 25, 2014 Office Action issued in Japanese Patent Application No. 2011-195275.

* cited by examiner

*Primary Examiner* — Dung Van Nguyen
(74) *Attorney, Agent, or Firm* — Oliff PLC

(57) ABSTRACT

In a power tool dust collecting device, a blocking ring that is subject to elastic deformation upon contact with a workpiece surface for blockage between a suction head and the workpiece surface is provided to the front surface of the suction head to be brought into contact with the workpiece surface. The blocking ring has a ventilating portion (a V-shaped slit) that ensures the flow of air to the suction head regardless of whether the elastic deformation has occurred.

13 Claims, 13 Drawing Sheets

POWER TOOL DUST COLLECTING DEVICE AND POWER TOOL

BACKGROUND OF THE INVENTION

This application claims the benefit of Japanese Patent Application Number 2011-195275 filed on Sep. 7, 2011 and Japanese Patent Application No. 2011-220375 filed on Oct. 4, 2011, the entirety of which is incorporated by reference.

TECHNICAL FIELD

The present invention relates to a power tool dust collecting device that is mounted to a power tool such as an electric drill or a hammer drill and a power tool equipped with the dust collecting device.

BACKGROUND ART

A power tool such as an electric drill or a hammer drill is equipped with a dust collecting device that collects and recovers dust generated from a workpiece upon drilling and the like. As disclosed in the specification of German Patent Application Publication No. 102006039969, the dust collecting device includes, at a tip end of an arm fanning a dust collecting path, a cylindrical suction head through which a tip end tool mounted to the power tool penetrates and of which a side for contacting a workpiece surface is made of a flexible material such as rubber. By pressing the suction head against a workpiece to perform drilling, etc., dust generated from the workpiece can be sucked in together with outside air from the suction head and captured with a filter provided inside.

When the suction head is inclined with respect to the workpiece surface due to the power tool being, for example, tilted in the dust collecting device in the specification of German Patent Application Publication No. 102006039969, a gap between the workpiece surface and the suction head increases and the suction force decreases. However, if the flexibility of the suction head is increased, the suction head is in close contact with the workpiece surface, which adversely affects the flow of air, and then the suction amount of outside air is reduced. As a result, the dust collecting efficiency decreases.

SUMMARY OF THE INVENTION

Thus, it is an object of the present invention to provide a power tool dust collecting device and a power tool that can maintain the flow of air without a decrease in the suction force even if a suction head is, for example, tilted so that a suitable dust collecting efficiency can be obtained.

In order to achieve the object described above, a first aspect of the invention provides a power tool dust collecting device, including a casing mountable on a power tool, a cylindrical suction head that is provided to protrude from the casing, allows a tip end tool of the power tool to penetrate while in contact with a workpiece surface, and is connected at a circumferential surface to the casing such that an axis is directed in a front-rear direction, a dust collecting path that is provided in the casing so that air is sucked in from the suction head and introduced into the casing, a filter that is provided on the dust collecting path and capable of capturing dust sucked in together with the air, a blocking ring that is provided to a front surface of the suction head and subject to elastic deformation upon contact with the workpiece surface for blockage between the suction head and the workpiece surface, and a ventilating portion that is formed in the blocking ring to ensure a flow of air into the suction head regardless of whether the elastic deformation has occurred.

A second aspect of the invention provides a configuration according to the first aspect, in which the ventilating portion is a V-shaped slit that is formed in a radial direction of the blocking ring with an inner circumferential edge of the blocking ring as a starting end, such that a width decreases as a distance from the inner circumferential edge increases.

A third aspect of the invention provides a configuration according to the first aspect, in which a rear surface of the suction head is an inclined surface that is formed such that a length in an axial direction decreases as a distance from a connecting portion between the casing and the suction head increases.

A fourth aspect of the invention provides a configuration according to the first aspect, in which the ventilating portion is provided to avoid a position directly below center of the suction head.

A fifth aspect of the invention provides a configuration according to the first aspect, in which the blocking ring is provided to be detachable.

In order to achieve the object described above, a twelfth aspect of the invention provides a power tool equipped with a power tool dust collecting device according to the first aspect.

In the first and twelfth aspects of the invention, since the blocking ring including the ventilating portion is employed, the flow of air can be maintained without a decrease in the suction force even if the suction head is, for example, tilted. Therefore, a suitable dust collecting efficiency can be obtained.

In the second aspect of the invention, in addition to the effect of the first aspect, the V-shaped slit is provided as the ventilating portion. Thus, a suitable ventilating portion that maintains the flow of air while ensuring the elastic deformation of the blocking ring can be obtained.

In the third aspect of the invention, in addition to the effect of the first aspect, by forming the inclined surface, stagnation of air within the suction head can be prevented so that a smooth flow of air is ensured.

In the fourth aspect of the invention, in addition to the effect of the first aspect, the risk of dust falling outside via the ventilating portion is reduced, In the fifth aspect of the invention, in addition to the effect of the first aspect, the blocking ring is detachably provided so that replacement in case of deterioration or damage can be easily performed.

DETAILED DESCRIPTION OF THE EMBODIMENTS

Embodiments of the present invention will be described below based on the drawings.

[First Embodiment]

Figure 1:
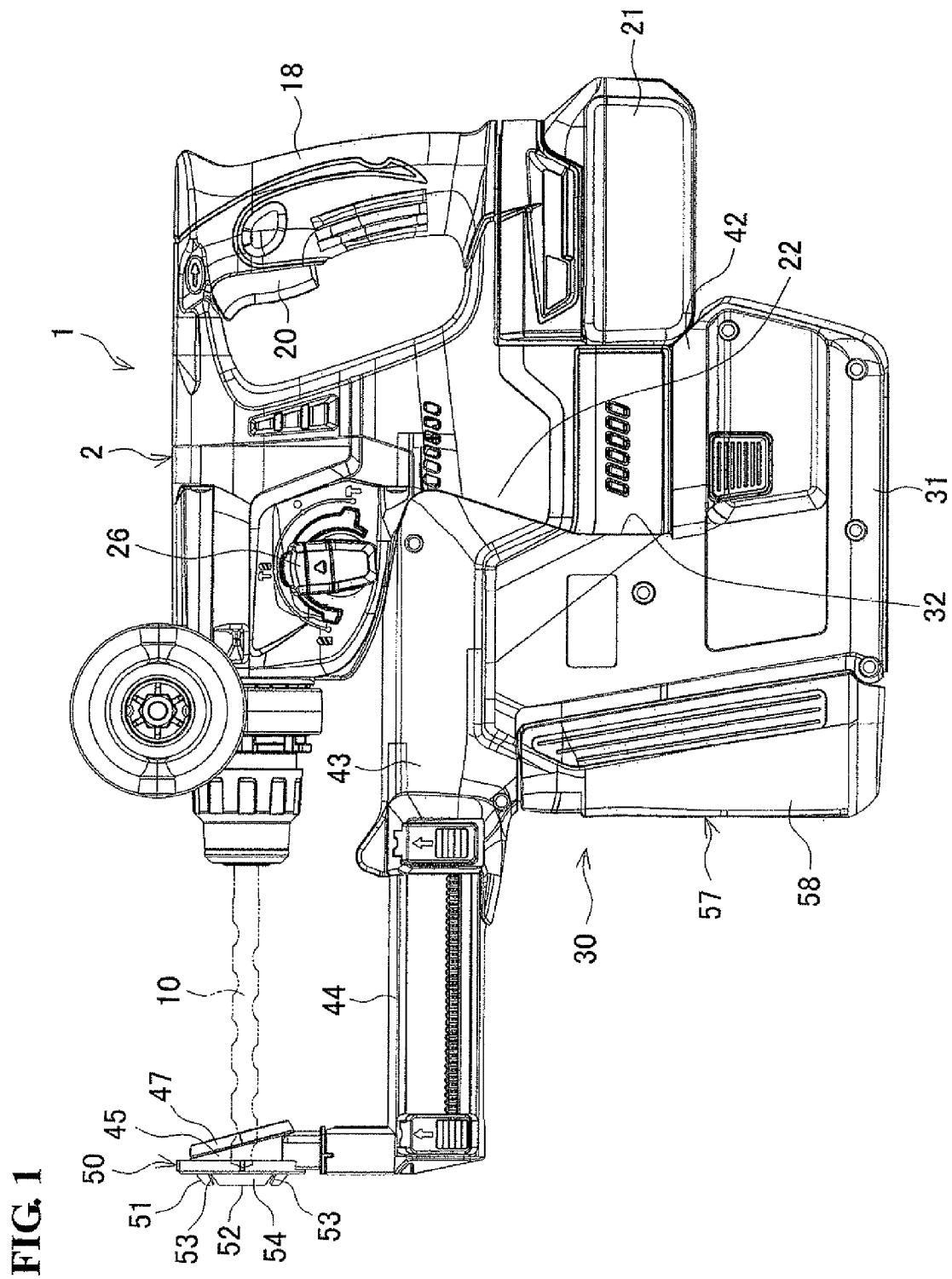
FIG. 1 is a side view of a hammer drill equipped with a power tool dust collecting device in a first embodiment of the present invention.
Figure 2:
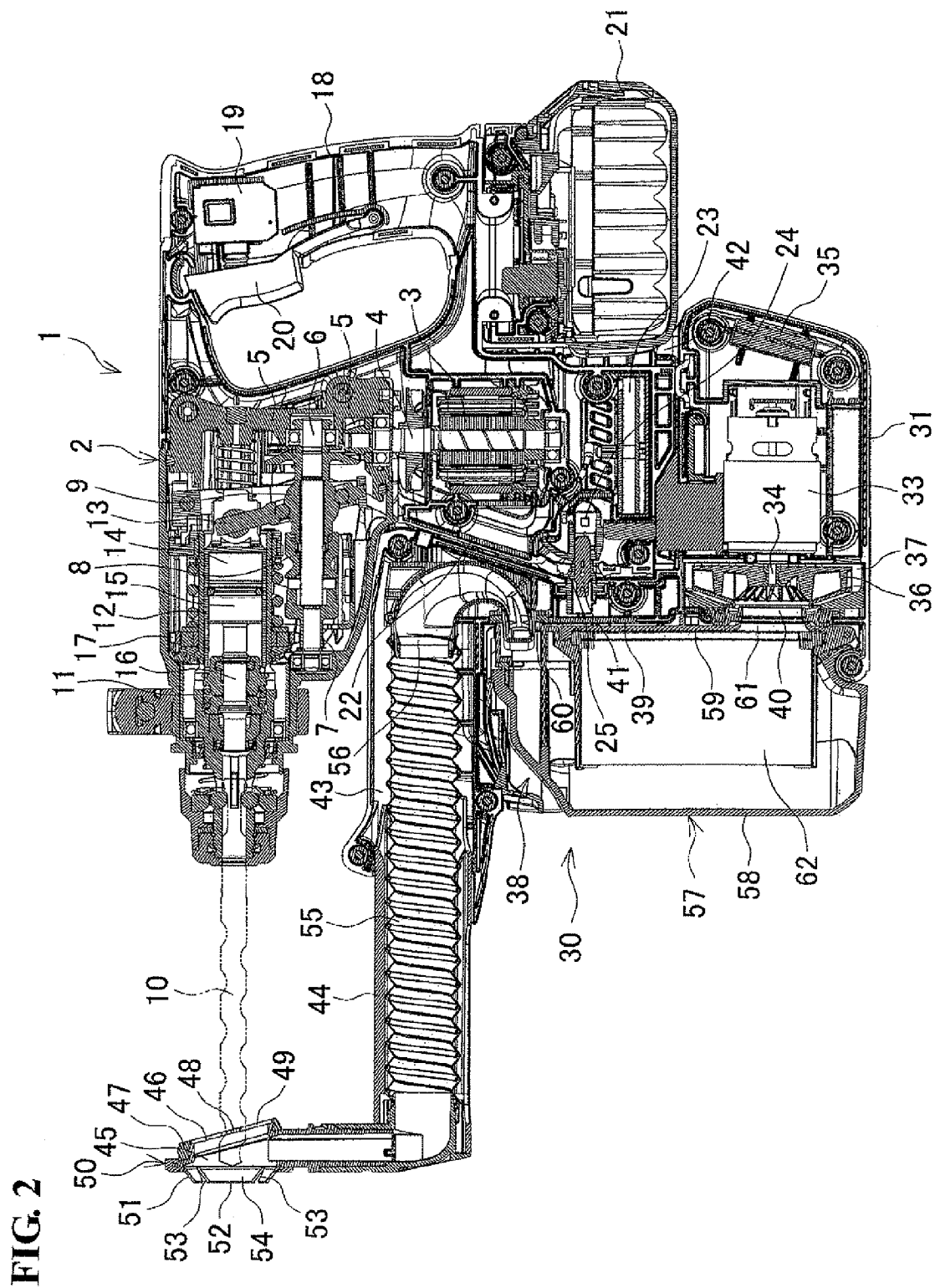
FIG. 2 is a vertical-sectional view of the hammer drill equipped with the power tool dust collecting device in the first embodiment.

FIG. 1 is a side view of a hammer drill, as one example of a power tool, equipped with a power tool dust collecting device (hereinafter simply referred to as "dust collecting device"), and FIG. 2 is a vertical-sectional view of the hammer drill.

In a hammer drill 1, a housing 2 formed by assembling a pair of left and right half housings accommodates a motor 3 in a lower portion on the front side (front side being the left side in FIGS. 1 and 2), such that an output shaft 4 is directed upward. An intermediate shaft 6 is provided above the motor 3 and torque is transmitted to the intermediate shaft 6 via bevel gears 5. The intermediate shaft 6 is provided with a first gear 7, a clutch 8, and a boss sleeve 9 in this order from the front. Above the intermediate shaft 6, a tool holder 11 to which a bit 10 as a tip end tool can be inserted at the tip end is rotatably supported in parallel to the intermediate shaft 6. An arm 13 is mounted on the exterior of the boss sleeve 9 with a swash bearing therebetween. The arm 13 is connected to the rear end of a piston cylinder 12 loosely inserted in the rear of the tool holder 11. Inside the piston cylinder 12, a striker 15 is provided to be movable forward or rearward by way of an air chamber 14, so as to be capable of striking an impact bolt 16 provided in the front of the striker 15. The first gear 7 meshes with a second gear 17 mounted to the tool holder 11.

A handle 18 including a switch 19 and a switch lever 20 is provided in an upper portion on the rear side of the housing 2. Below the handle 18, a battery pack 21 as a power source is mounted. A lower portion on the front side of the housing 2 is a mounting portion 22 that protrudes to the front of the battery pack 21 with the front surface inclined downward toward the front and to which a dust collecting device 30 is mounted. Inside the mounting portion 22, a controller 23 electrically connected to a coil of the motor 3, the switch 19, and the battery pack 21 is accommodated.

A connector 24 is provided on the upper side in the front of the controller 23. The connector 24 has three female terminals for power source and for communication that are aligned in the left-right direction. On the front surface of the mounting portion 22, a quadrangle-shaped socket 25 is provided to be open in the front of the connector 24.

Figure 3:
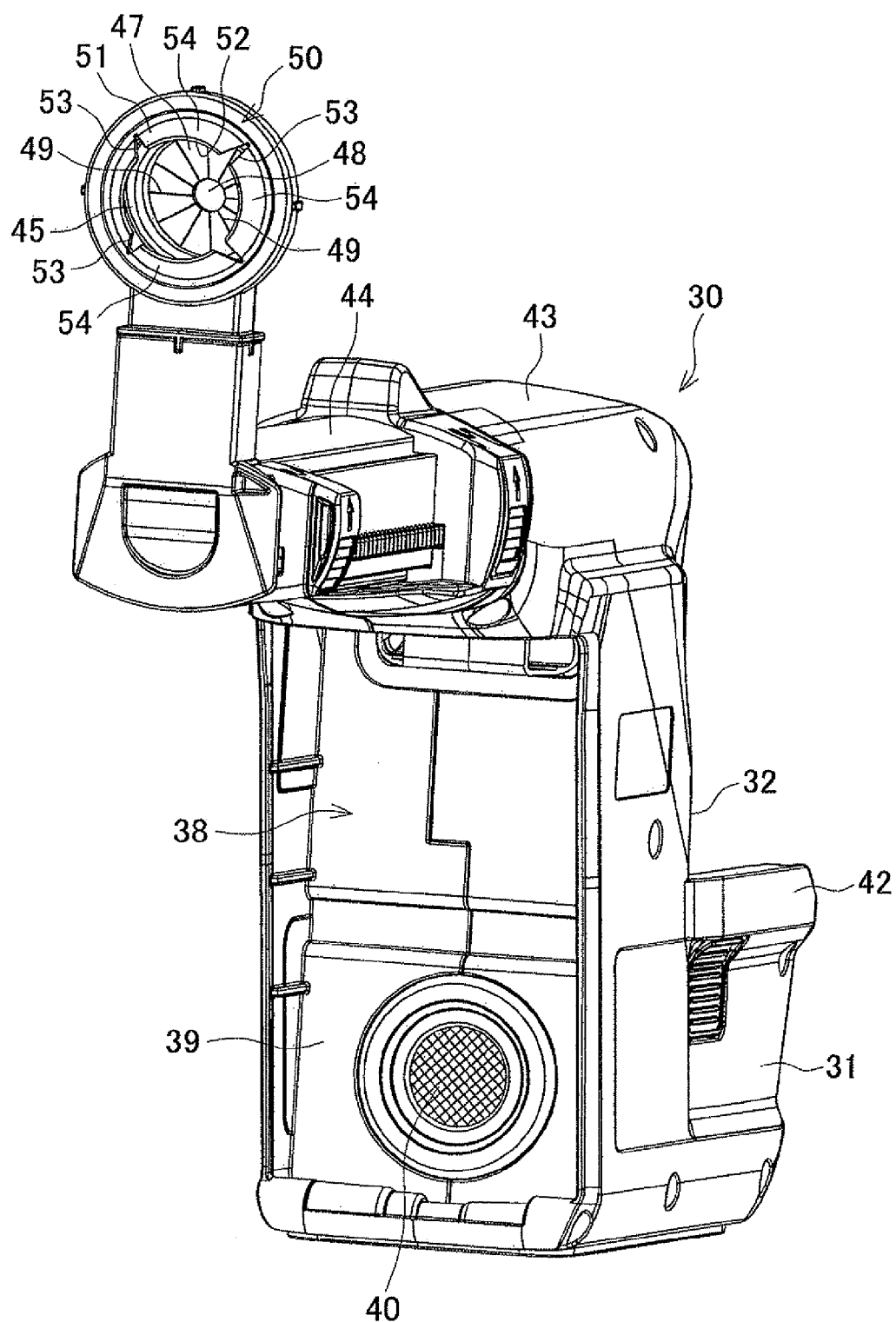
FIG. 3 is a perspective view of the power tool dust collecting device in the first embodiment.

The dust collecting device 30 has a casing 31 that is L-shaped when seen from the side, the casing being formed by assembling of left and right half casings. A fitting concave portion 32 that fits with the mounting portion 22 of the hammer drill 1 is formed in an upper right portion of the dust collecting device 30. In the rear of the casing 31, a motor 33 is accommodated horizontally such that an output shaft 34 is directed to the front. A controller 35 is provided in the rear of the motor 33. A dust collecting fan 36 is secured to the output shaft 34. The dust collecting fan 36 is accommodated in an intake chamber 37 formed as a compartment inside the casing 31 and including a discharge opening (not shown) at the side surface of the intake chamber 37. Reference numeral 38 denotes a joining portion for a dust box formed in the casing 31 in the front of the intake chamber 37. The joining portion 38 has a concave shape that is open only in the front, as shown in FIG. 3. In a partition wall 39 on the rear side that is the base of the joining portion 38, a communication hole 40 is formed coaxially with the dust collecting fan 36 and communicates the joining portion 38 with the intake chamber 37.

On the rear surface in an upper portion of the casing 31, three plate-shaped male terminals 41 for power source and for communication are aligned at predetermined intervals in the left-right direction so as to protrude to the rear.

Furthermore, on left and right sides in a rear portion of the casing 31, a guide rail 42 is provided, respectively, to be upright in the front-rear direction at an interval that enables a lower portion of the mounting portion 22 to fit.

Above the joining portion 38, a guide passage 43 is formed in the front-rear direction. The guide passage 43 has an open front end and a rear end making a U-turn toward the rear of the joining portion 38. At the front end of the guide passage 43, an L-shaped nozzle 44 of which the front end is directed upward is connected to protrude and to be biased to the front in a state where extension or compression is possible in the front-rear direction. A suction head 45 is formed at the tip end of the nozzle 44.

The suction head 45 can be penetrated coaxially by the bit 10 with the axis directing in the front-rear direction and has a cylindrical shape that communicates with the nozzle 44 at a lower portion of the circumferential surface. On the rear surface of the suction head 45, an inclined surface 46 is formed such that the length in the axial direction of the suction head 45 decreases as the distance from a connecting portion between the nozzle 44 and the suction head 45 increases. The inclined surface 46 has an opening directed diagonally upward on the rear side. The opening on the rear side is fitted with a rubber cap 47 having a through hole 48 on the axis of the bit 10. The rubber cap 47 has a plurality of cutouts 49 communicating from the through hole 48 in a radial manner, so that the bit 10 can penetrate in a state where the opening on the rear side is substantially blocked.

Figure 4A:
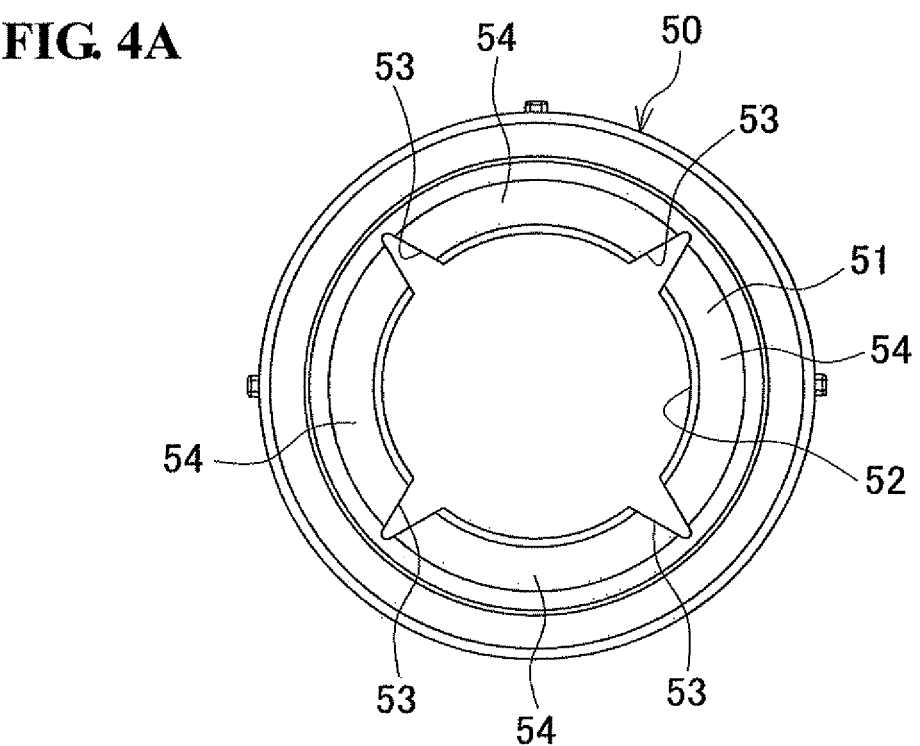
FIG. 4A shows a front view of a suction head in the first embodiment before elastic deformation.

A blocking ring 50 made of rubber is detachably fitted to an opening on the front side of the suction head 45. The inner circumference of the blocking ring 50 has a taper portion 51 that is tapered toward the front and of which the front end is an opening 52 smaller than the opening on the front side of the suction head 45. As shown in FIGS. 3 and 4A, the taper portion 51 has slits 53 in four parts at equal intervals in the circumferential direction as ventilating portions communicating from the opening 52 in radial directions, such that the taper portion 51 is divided into four elastic pieces 54. The respective slits 53 are formed in pairs on straight diagonal lines that intersect at right angles to each other, such that a position directly below the center of the opening 52 is avoided.

Figure 4B:
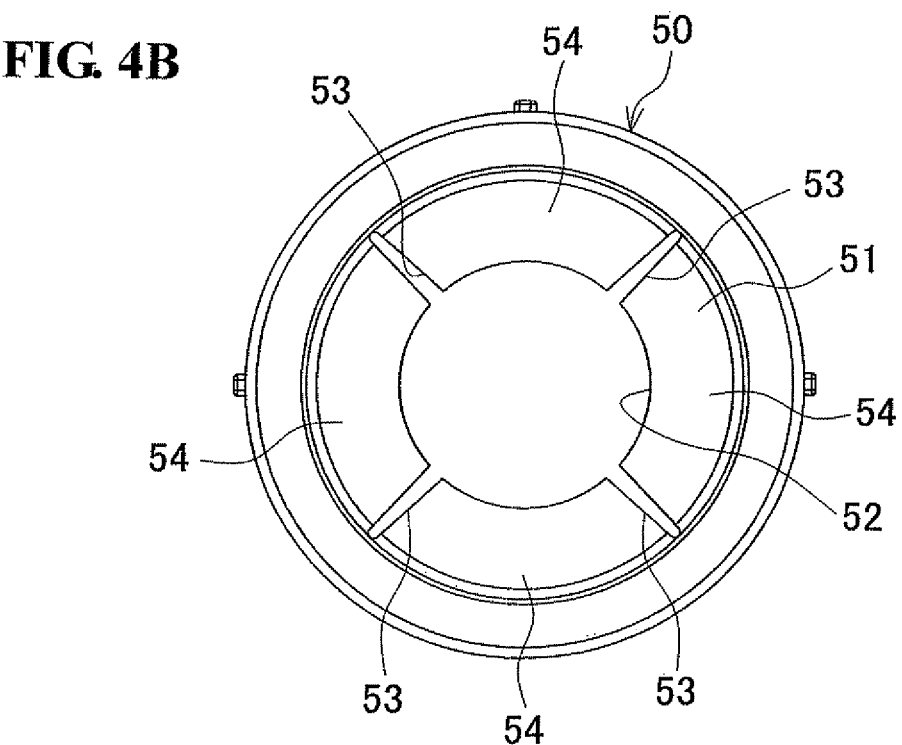
FIG. 4B shows a front view of a suction head in the first embodiment after elastic deformation.

Each slit 53 is formed in a V-shape such that the width is widest at a communicating portion with the opening 52 and gradually decreases toward the outside. An outermost portion (tip end portion) of each slit 53 is formed not in a pointed tip shape but in a half circle shape. Accordingly, even if each elastic piece 54 is elastically deformed up to the opening on the front side of the suction head 45, contact of the elastic pieces 54 adjacent across the slit 53 does not block the slit 53, and the slit 53 remains in a state where the width is narrowed, as shown in FIG. 4B.

A flexible hose 55 is accommodated in the nozzle 44 and the guide passage 43 so as to extend along the nozzle 44 and the guide passage 43. The rear end of the flexible hose 55 is connected to a cylindrical duct 56 that is bent in a U-shape along the shape of the rear end of the guide passage 43. A tip end portion of the duct 56 penetrates the partition wall 39 and protrudes into the joining portion 38.

Reference numeral 57 denotes a dust box that is detachably mounted to the joining portion 38. The dust box 57 includes a rectangular parallelepiped box body 58 and a lid body 59 that is joined at an opening of the box body 58 with a hinge. The lid body 59 has an entrance 60 and an exit 61 on the upper side and the lower side, respectively. The lid body 59 also has, in a position covering the exit opening 61, a filter unit 62 having a folded filter made of paper.

With the hammer drill 1 and the dust collecting device 30 configured as described above, when the dust collecting device 30 is mounted on the hammer drill 1, the lower portion of the mounting portion 22 of the hammer drill 1 is aligned with the guide rail of the casing 31. The mounting portion 22 is located above the rear portion of the casing 31 and the dust collecting device 30 slides to the rear such that the fitting concave portion 32 fits to the mounting portion 22 from the front. Accordingly, both sides of the lower portion of the mounting portion 22 are joined with the guide rails 42, and the male terminal 41 of the dust collecting device 30 enters the socket 25 into the housing 2 to be electrically connected with the connector 24 (FIG. 1).

When the hammer drill 1 is held and the suction head 45 is set by being pressing against the workpiece surface after the dust collecting device 30 is mounted in this manner, the opening 52 of the blocking ring 50 in contact with the workpiece surface is blocked, and each elastic piece 54 is elastically deformed to the rear. It should be noted that since each slit 53 is not blocked, as shown in FIG. 4B, ventilation between the taper portion 51 and the outside thereof is ensured.

When the pressing operation of the switch lever 20 of the hammer drill 1 turns the switch 19 ON, the motor 3 is driven to rotate the intermediate shaft 6. By operating a switch knob 26 provided to the side surface of the housing 2 to slide the clutch 8 at this time, the mode of the clutch 8 can be selected as follows. By selecting a forward position for engagement with only the first gear 7, it is possible to select a drill mode in which the rotation of the tool holder 11 via the second gear 17 causes the bit 10 to rotate. By selecting a rearward position for engagement with only the boss sleeve 9, it is possible to select a hammer mode in which swinging of the arm 13 causes the piston cylinder 12 to reciprocate so that the striker 15 in conjunction therewith strikes the bit 10 via the impact bolt 16. By selecting an intermediate position for simultaneous engagement with the first gear 7 and the boss sleeve 9, it is possible to select a hammer drill mode in which rotation of the tool holder 11 and striking by the impact bolt 16 are performed simultaneously. When the hammer drill 1 moves forward in a state where the suction head 45 is set, the nozzle 44 is compressed to move the hammer drill 1 forward, and the bit 10 penetrates the suction head 45 so that a workpiece can be machined.

When the switch 19 is ON, the controller 23 supplies power to the controller 35 of the dust collecting device 30. Thus, the controller 35 drives the motor 33 and causes the dust collecting fan 36 to rotate. Then, outside air is sucked into the suction head 45 via each slit 53 of the blocking ring 50, passes through the flexible hose 55 and the duct 56, and is discharged into the dust box 57. Then, the air passes through the filter unit 62, reaches the intake chamber 37 via the communication hole 40 from the exit 61, and is discharged outside from the discharge opening provided to the intake chamber 37. Therefore, dust generated from the workpiece is sucked into the suction head 45, enters the nozzle 44, the flexible hose 55, and the duct 56 into the dust box 57. Then, the dust is captured by the filter unit 62, and is stored in the box body 58.

The air that has been sucked in the suction head 45 flows smoothly toward the nozzle 44 without stagnation inside the suction head 45 at this time because the upper side of the suction head 45 is formed to be narrow in the front-rear direction by the inclined surface 46 in a rear portion.

Even if the hammer drill 1 and the dust collecting device 30 are tilted during machining, each elastic piece 54 of the blocking ring 50 is elastically deformed according to the tilt at the suction head 45. Therefore, a blocked state of the opening 52 is maintained, and the flow of outside air via the slit 53 is ensured.

When the switch 19 is turned OFF by release of the pressing of the switch lever 20, the motor 3 stops and the rotation of the bit 10 and other operations stop. However, as the controller 23 has a delay function in which the flow of electricity to the dust collecting device 30 is stopped with a few seconds of delay after the switch 19 is turned OFF. Therefore, in the dust collecting device 30, the dust collecting fan 36 continues to rotate for a few seconds after the bit 10 has stopped. Thus, dust remaining in the nozzle 44, the flexible hose 55, etc., can also be reliably collected into the dust box 57.

To detach the dust collecting device 30, an opposite manner to mounting of the dust collecting device 30 is made. When the dust collecting device 30 is slid to the front from the hammer drill 1, the fitting concave portion 32 is detached from the mounting portion 22 and the male terminal 41 is departed from the connector 24 and is removed from the socket 25.

In this manner, according to the dust collecting device 30 and the hammer drill 1 in the embodiment described above, the blocking ring 50, which is subject to elastic deformation upon contact with the workpiece surface for blockage between the suction head 45 and the workpiece surface, is provided to the front surface of the suction head 45. Further, the blocking ring 50 has the ventilating portion (the slit 53) that ensures the flow of air to the suction head 45 regardless of whether the elastic deformation has occurred. Thus, the flow of air can be maintained without a decrease in the suction force even if the suction head 45 is tilted, so that a suitable dust collecting efficiency can be obtained.

Particularly in this embodiment, the V-shaped slit 53 is provided as the ventilating portion and is formed in a radial direction of the blocking ring 50, with the inner circumferential edge of the blocking ring 50 as the starting end. The width of the V-shaped slit 53 decreases as the distance from the inner circumferential edge increases. Thus, a suitable ventilating portion can be obtained so as to maintain the flow of air while ensure the elastic deformation of the blocking ring 50.

Further, the rear surface of the suction head 45 is provided as the inclined surface 46. The inclined surface 46 is formed such that the length in the axial direction of the suction head 45 decreases as the distance from the connecting portion between the casing 31 and the suction head 45 increases. Thus, stagnation of air within the suction head 45 can be prevented to ensure a smooth flow of air.

Furthermore, the risk of dust falling outside via the slit 53 is reduced since the slit 53 is provided not at a position directly below the center of the suction head 45.

In addition, replacement in case of deterioration or damage can easily be performed, because the blocking ring 50 is provided to be detachable.

The V-shaped slit is employed as the ventilating portion in the embodiment described above. Even if the base end of the slit may a flat portion instead of the half circle shape, ventilation with the slit is ensured when the elastic piece has moved rearward. Also, even if the base end is a pointed tip shape, end edges of the elastic piece on both sides of the slit is formed in a curved concave shape, thereby ensuring ventilation when the elastic piece has moved rearward.

Figure 5:
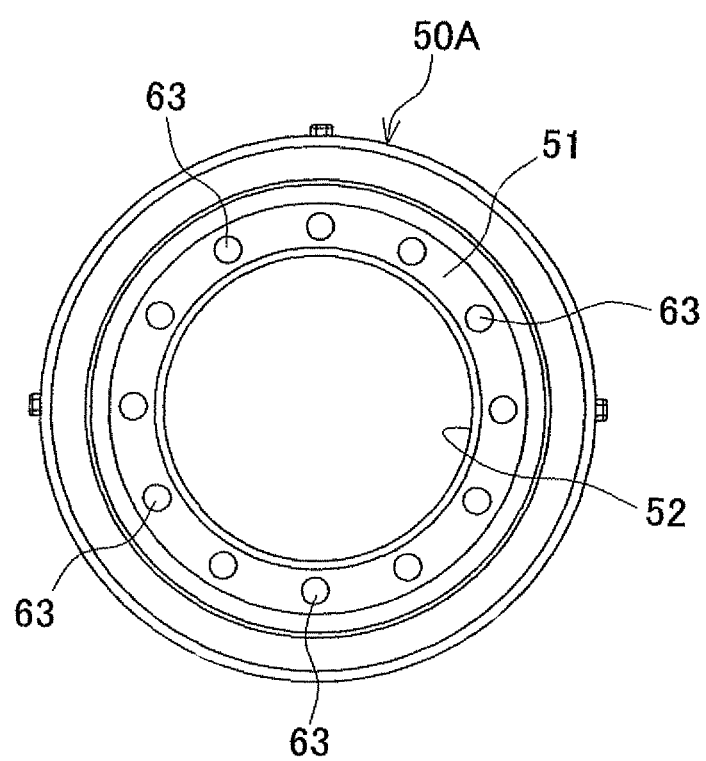
FIG. 5 is a front view of the suction head in a modified example of the first embodiment.
Figure 6:
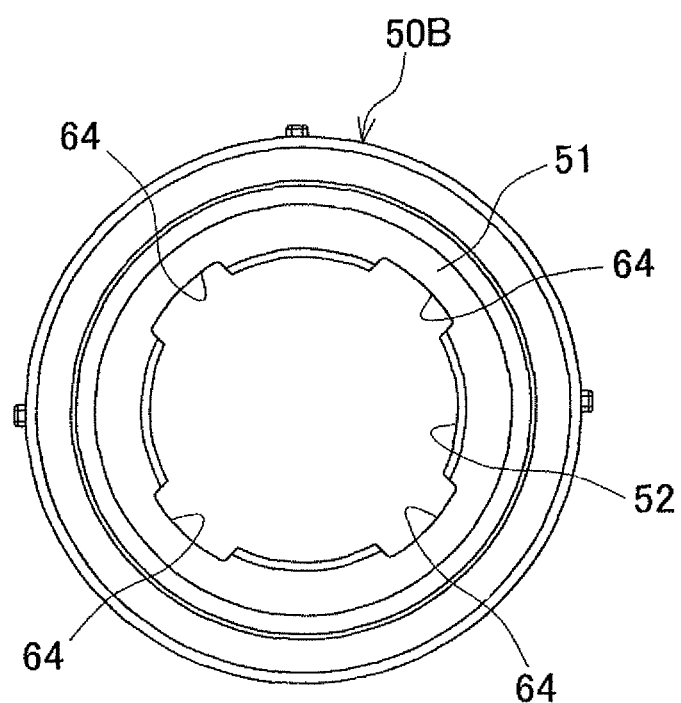
FIG. 6 is a front view of the suction head in another modified example of the first embodiment.

Furthermore, instead of the slit, a plurality of through holes 63 may be provided as the ventilating portion at predetermined intervals in the circumferential direction at the taper portion 51 that is not divided in the circumferential direction, as in a blocking ring 50A shown in FIG. 5, for example. The flow of outside air via the through hole 63 is ensured in this case as well, because the through hole 63 is not blocked even if the taper portion 51 is elastically deformed. It is also conceivable to form a plurality of cutouts 64 as the ventilating portion. The cutouts 64 are provided at predetermined intervals in the circumferential direction at the inner edge of the opening 52 of the taper portion 51 that is not divided in the circumferential direction in the same manner, as in a blocking ring 50B shown in FIG. 6. The flow of outside air via the cutout 64 is ensured in this case as well, because the cutout 64 is not blocked even if the taper portion 51 is elastically deformed.

Moreover, in the hammer drill of the embodiment described above, the arrangement of the motor or the battery pack may be modified. It may also be such that the connector is provided not to rotate but to be slidable between a connecting position and a non-connecting position in the up-down or left-right direction and be biased to the non-connecting position by a biasing unit such as a coil spring or a flat spring. The power supply to the dust collecting device may also be appropriately modified. For example, the relation between the male terminal and the female terminal may be reversed, a terminal portion instead of a socket for the terminal may be provided at the joining portion for the mounting portion and the fitting concave portion to contact both. Obviously, the blocking ring according to the present invention can be employed not only in a dust collecting device including a motor or a dust collecting fan but also in such an embodiment where only a filter is provided and the suction force is obtained from a fan provided to a power tool.

Further, the power tool is not limited to a hammer drill, and the present invention can be applied to a different type of models such as an electric drill as long as a similar dust collecting device is mountable.

[Second Embodiment]

Figure 7:
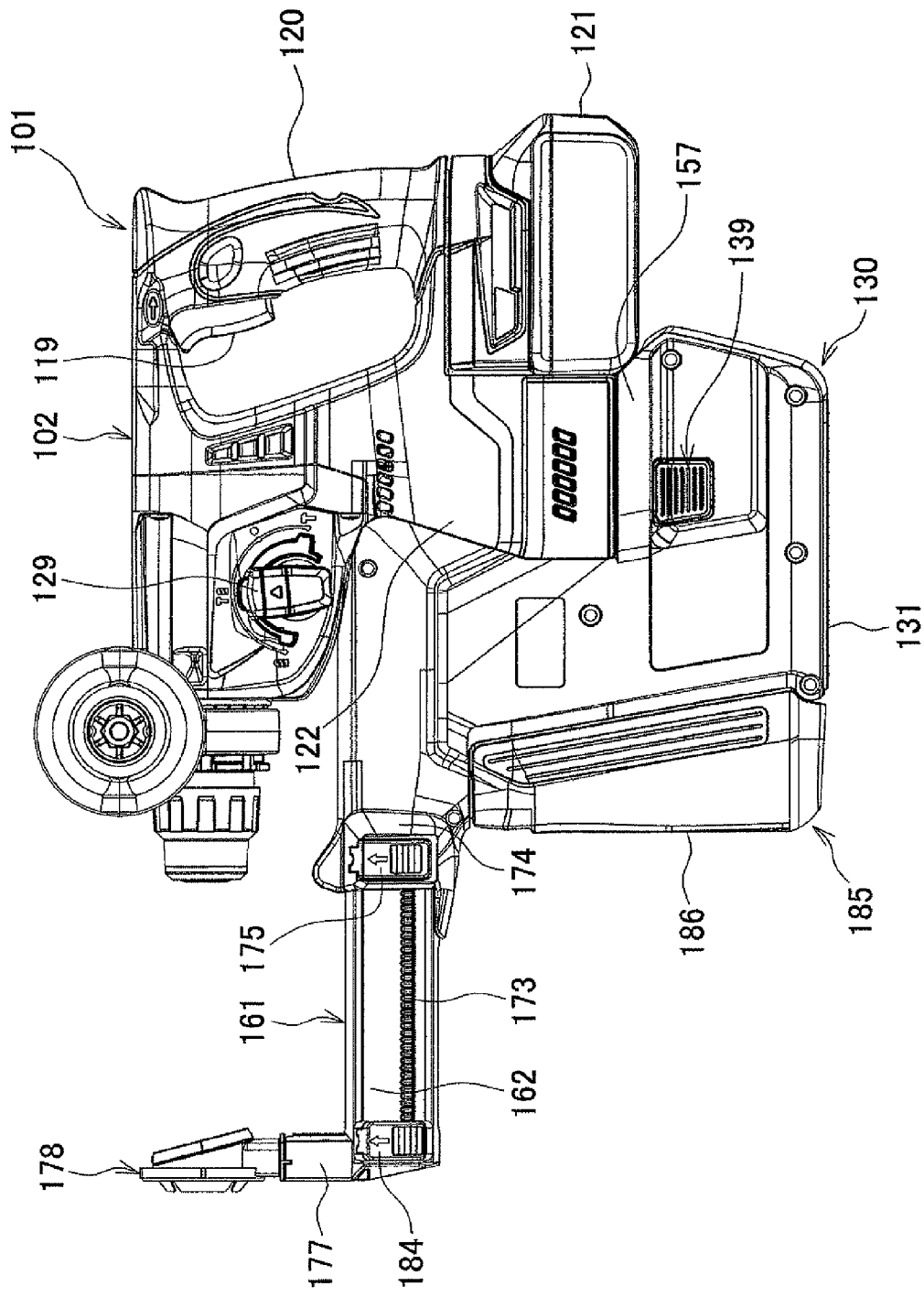
FIG. 7 is a side view of a hammer drill equipped with a power tool dust collecting device in a second embodiment of the present invention.
Figure 8:
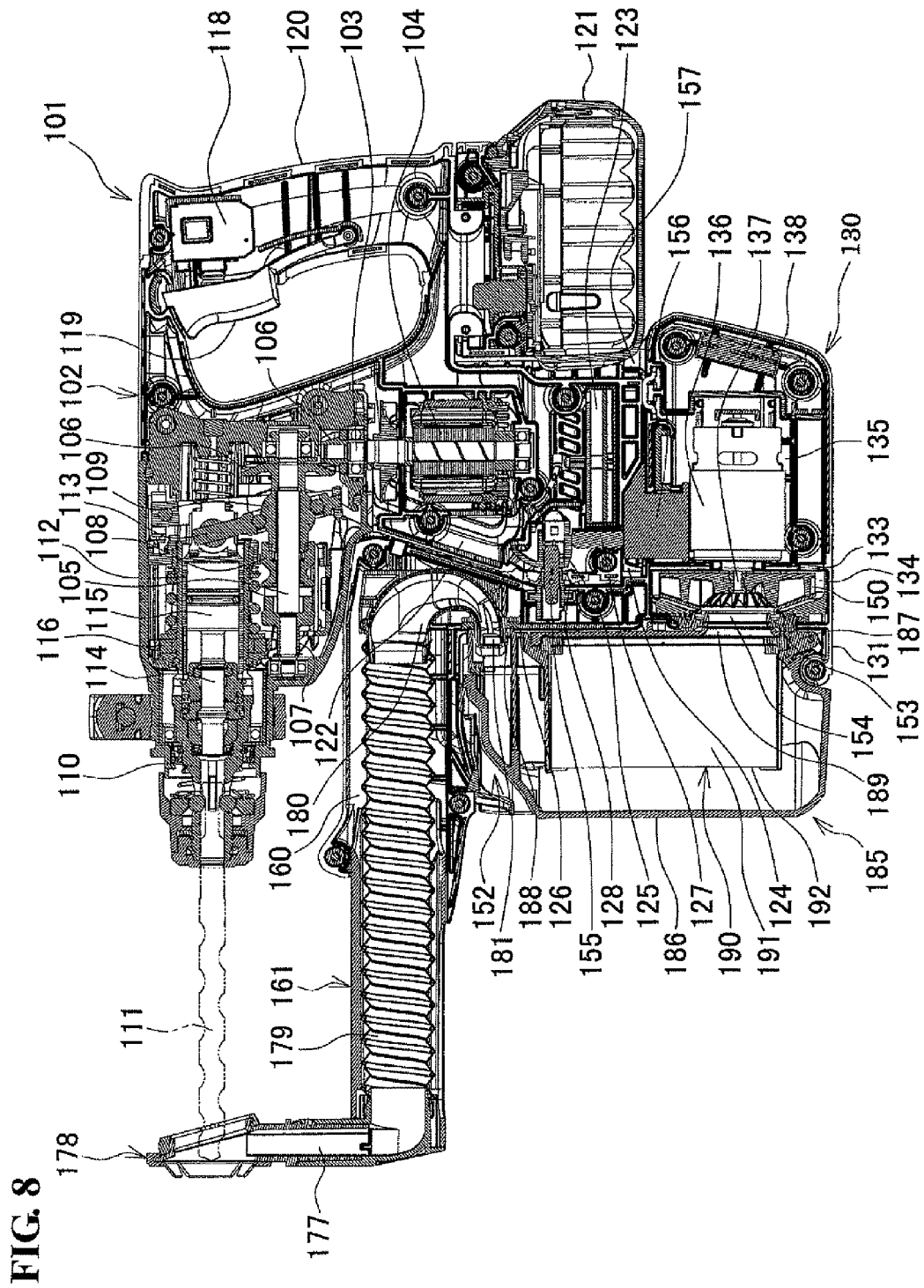
FIG. 8 is a sectional side view of the hammer drill equipped with the power tool dust collecting device in the second embodiment.
Figure 9:
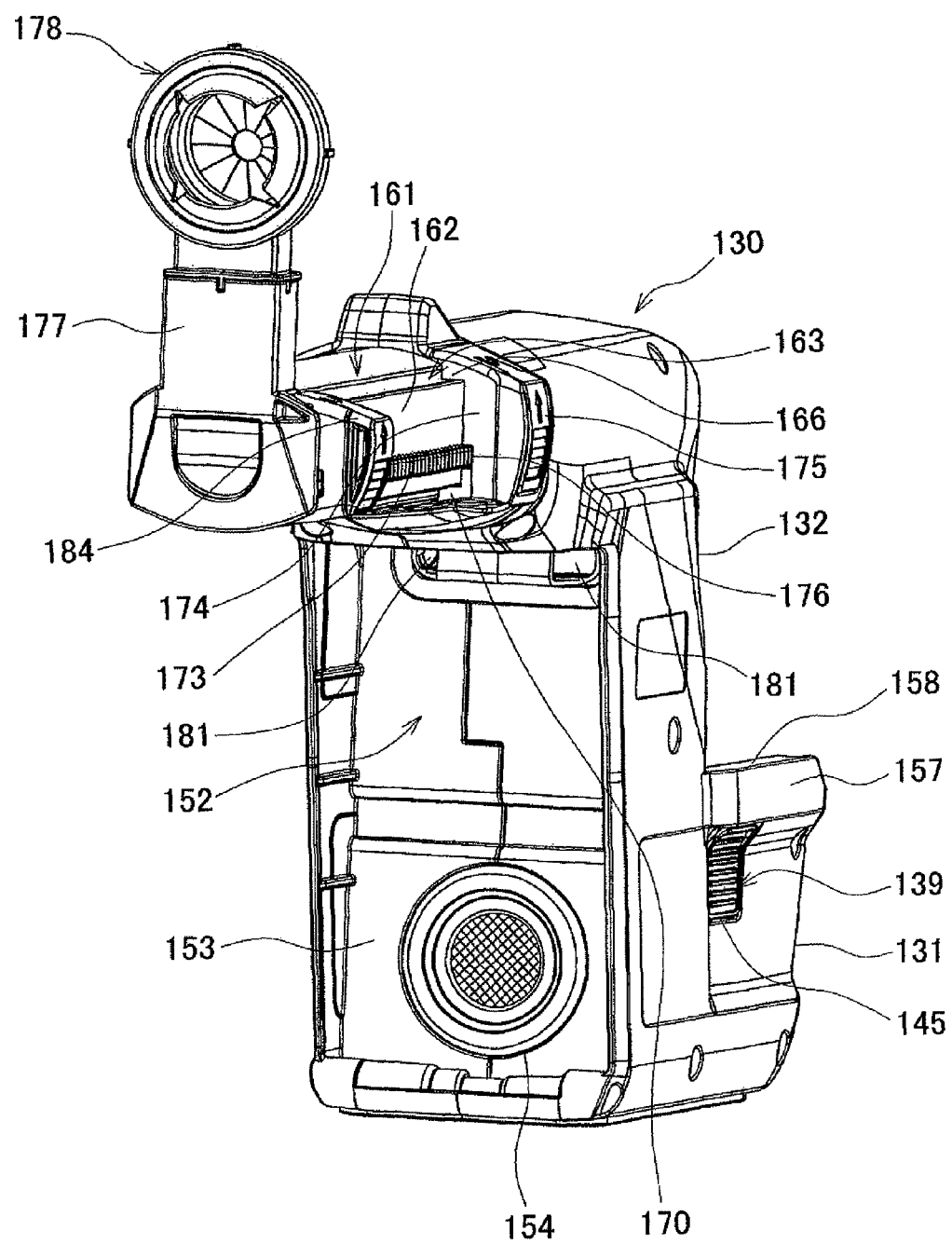
FIG. 9 is a perspective view of the power tool dust collecting device from which a dust box is detached in the second embodiment.

Another embodiment of the present invention will be described with reference to FIGS. 7 to 13. FIGS. 7 and 8 show a state where a power tool dust collecting device 130 (hereinafter referred to as dust collecting device 130) is mounted on a hammer drill 101, and FIG. 9 shows the dust collecting device 130. The hammer drill 101 is one example of the power tool according to the present invention and includes a body housing 102 made of resin. In FIGS. 7 and 8, the left side is the front side of the body housing 102, and the right side is the rear side of the body housing 102. As shown in FIG. 8, a motor 104 with an output shaft 103 directed upward is accommodated in a lower portion on the front side in the body housing 102. Above the output shaft 103 in the body housing 102, an intermediate shaft 105 is rotatably supported in a direction that intersects with the output shaft 103, so that torque is transmitted from the output shaft 103 to the intermediate shaft 105 via bevel gears 106. The intermediate shaft 105 includes a first gear 107, a clutch 108, and a boss sleeve 109 in this order from the front side. Above the intermediate shaft 105 in the body housing 102, a tool holder 110 is rotatably supported in parallel to the intermediate shaft 105, and a bit 111 can be inserted into the tip end of the tool holder 110. On the rear side of the tool holder 110, a piston cylinder 112 is loosely inserted. The rear end of the piston cylinder 112 is connected to an arm 113 mounted on the exterior of the boss sleeve 109. Inside the piston cylinder 112, an impact bolt 114 is accommodated on the front side thereof, and a striker 115 that strikes the impact bolt 114 is accommodated on the rear side thereof. The impact bolt 114 and the striker 115 are movable forward or rearward. The first gear 107 meshes with a second gear 116 mounted to the tool holder 110.

As shown in FIG. 8, a handle 120 including a switch 118 and a switch lever 119 is provided in an upper portion on the rear side of the body housing 102, and a battery pack 121 as a power source is mounted below the handle 120. The lower portion on the front side of the body housing 102 is a mounting portion 122 that protrudes to the front of the battery pack 121. The front surface of the mounting portion 122 is inclined downward toward the front. The dust collecting device 130 is mounted to the mounting portion 122. A controller 123 is accommodated inside the mounting portion 122, and a coil of the motor 104, the switch 118, and the battery pack 121 are electrically connected to the controller 123. Furthermore, in the middle of the lower surface of the mounting portion 122 in the left-right direction, a guide groove 124 of which the front end is open to the front side extends in the front-rear direction so as to be recessed.

In an upper portion on the front side of the controller 123 in the mounting portion 122, a connector 125 is provided. In the connector 125, three female terminals for power source and for communication are aligned at predetermined intervals in the left-right direction. The connector 125 has a prism shape that is open on the front side, and a shutter portion 126 is integrally provided to be directed upward at the front end on the upper surface of the connector 125. In the middle of the lower surface of the mounting portion 122 and below the connector 125, a pressing piece 127 is supported to be movable in the up-down direction.

Furthermore, on the front side of the connector 125 at the front surface of the mounting portion 122, a quadrangle-shaped socket 128 is formed to be open. The connector 125 is rotatable to a connecting position and to a non-connecting position. The connecting position is a position in which the shutter portion 126 withdraws to the upper side of the socket 128 so that the opening is located directly behind the socket 128. The non-connecting position is a position in which the shutter portion 126 is located directly behind the socket 128 so that the opening withdraws below the socket 128. It should be noted that, in a state where the dust collecting device 130 is not mounted on the hammer drill 101, the connector 125 is biased by a torsion spring (not shown) to rotate to the non-connecting position in which the socket 128 is blocked by the shutter portion 126. In the non-connecting position, the pressing piece 127 is pressed by the connector 125 that has withdrawn to the lower side, and penetrates the mounting portion 122 to protrude into the guide groove 124.

The dust collecting device 130 includes a housing 131 that is L-shape when seen from the side, as shown in FIGS. 7 and 8. In FIGS. 7 and 8, the left side is the front side of the housing 131, and the right side is the rear side of the housing 131. In an upper portion on the rear side of the housing 131, a fitting concave portion 132 (see FIG. 9) fits with the mounting portion 122 of the hammer drill 101. As shown in FIG. 8, the rear side of the housing 131 is compartmented by a partition member 133 into a fan chamber 134 and a motor accommodating chamber 135. The fan chamber 134 and the motor accommodating chamber 135 are adjacent to each other in the front-rear direction of the housing 131.

Figure 10:
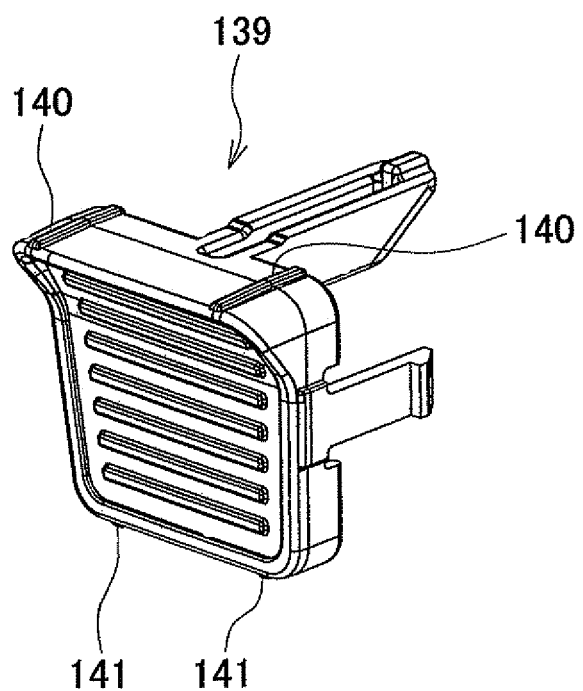
FIG. 10 is a perspective view of an operation button that is operated when detaching the power tool dust collecting device from the hammer drill in the second embodiment.

The motor accommodating chamber 135 accommodates a motor 136 horizontally such that an output shaft 137 is directed to the front side. Furthermore, the motor accommodating chamber 135 accommodates a controller 138 on the rear side of the motor 136. On the right side in an upper portion in the motor accommodating chamber 135, a button accommodating chamber 145 (see FIG. 9) is provided to be open on the right side surface of the housing 131 and accommodates an operation button 139 (see FIGS. 9 and 10). The operation button 139 is a button for locking the dust collecting device 130 to the hammer drill 101 in a joined state, and is pressed inward of the button accommodating chamber 145 when the dust collecting device 130 is to be detached from the hammer drill 101. The operation button 139 is biased outward of the button accommodating chamber 145 by a coil spring in a normal state. As shown in FIG. 10, the operation button 139 has upper ribs 140 that protrude upward from the upper surface and lower ribs 141 that protrude downward from the lower surface. At the time of the pressing operation of the operation button 139, the respective ribs 140 and 141 are guided inward of the button accommodating chamber 145 along the inner wall surface of the button accommodating chamber 145. A gap is provided between the inner wall surface of the button accommodating chamber 145 and a portion of the upper surface of the operation button 139 in which the ribs 140 do not protrude, and also a gap is provided between the inner wall surface and a portion of the lower surface of the operation button 139 in which the ribs 141 do not protrude.

As shown in FIG. 8, the output shaft 137 enters the fan chamber 134 from an opening of the partition member 133. A dust collecting fan 150 fixed to the output shaft 137 is accommodated in the fan chamber 134. In addition, as shown in FIGS. 8 and 9, a joining portion 152 for a dust box 185 (see FIGS. 7 and 8) described below is formed on the upstream side of the fan chamber 134 in the housing 131. The joining portion 152 has a concave shape that is open only on the front side. In a partition wall 153 that forms the base of the joining portion 152, a communication hole 154 that communicates the joining portion 152 with the fan chamber 134 is formed coaxially with the dust collecting fan 150.

As shown in FIG. 8, three plate-shaped male terminals 155, for power source and for a communication line, are aligned at predetermined intervals in the left-right direction the rear surface in the upper portion of the housing 131 so that the male terminals 155 protrude to the rear side. On the upper surface in a rear portion of the housing 131, a press rail 156 that fits with the guide groove 124 in the mounting portion 122 of the hammer drill 101 is provided to protrude in the front-rear direction of the housing 131. At the rear end of the press rail 156, an inclined surface decreases in height toward the rear side. On left and right sides of the press rail 156, a pair of guide rails 157 (see FIG. 9) is provided to be upright in the front-rear direction at an interval that enables a lower portion of the mounting portion 122 to fit. At the upper end of each guide rail 157, a convex rim 158 (see FIG. 9) that can fit with a joining groove (not shown) provided to the side surface of the mounting portion 122 is provided to protrude toward the inside.

Figure 11:
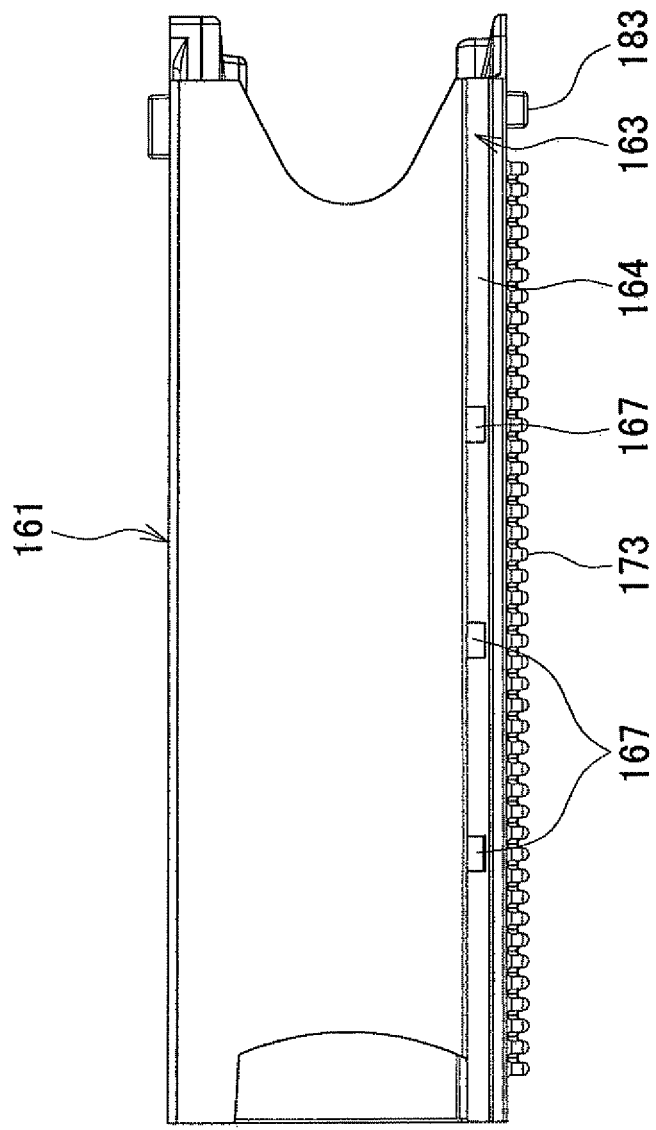
FIG. 11 is a plan view of a main portion of a ventilation member forming the power tool dust collecting device in the second embodiment.
Figure 12:
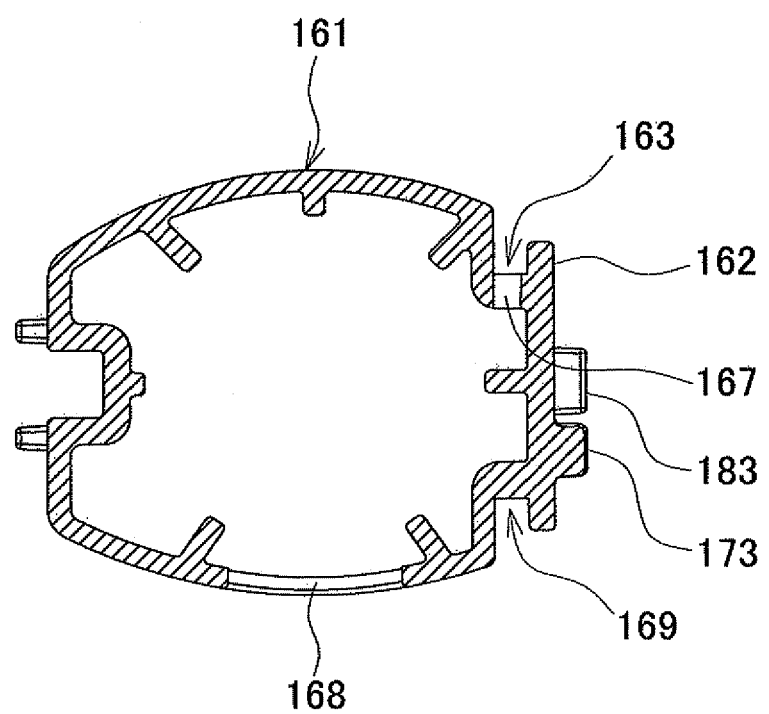
FIG. 12 is a vertical-sectional view of the ventilation member in the second embodiment.

Above the joining portion 152 in the housing 131, as shown in FIG. 8, a guide passage 160 is provided in the front-rear direction of the housing 131. The front end of the guide passage 160 is open and the rear end makes a U-turn toward the rear of the joining portion 152. At the front end of the guide passage 160 that corresponds to the front end of the housing 131, a ventilation member 161 is connected in a state where the ventilation member 161 protrudes to the front and can be inserted into the guide passage 160. The ventilation member 161 has a hollow shape in section, as shown in FIG. 12. In an upper portion on the right side of the ventilation member 161 when seen from the front, as shown in FIGS. 7, 9, and 12, a guide rail portion 162 that is long in the front-rear direction of the ventilation member 161 (left-right direction in FIG. 7) is provided. As shown in FIGS. 11 and 12, the guide rail portion 162 has a first concave groove 163 of which a base portion 164 extends in the front-rear direction and that is open on the upper side. In an upper portion on the front side of the housing 131, a first convex portion 166 (see FIG. 9) that can contact the upper surface of the guide rail portion 162 is provided to be directed downward. By sliding the upper surface of the guide rail portion 162 in the front-rear direction along the first convex portion 166, the ventilation member 161 slides smoothly in the front-rear direction. It should be noted that the first concave groove 163 is one example of a concave groove according to the present invention.

Figure 13:
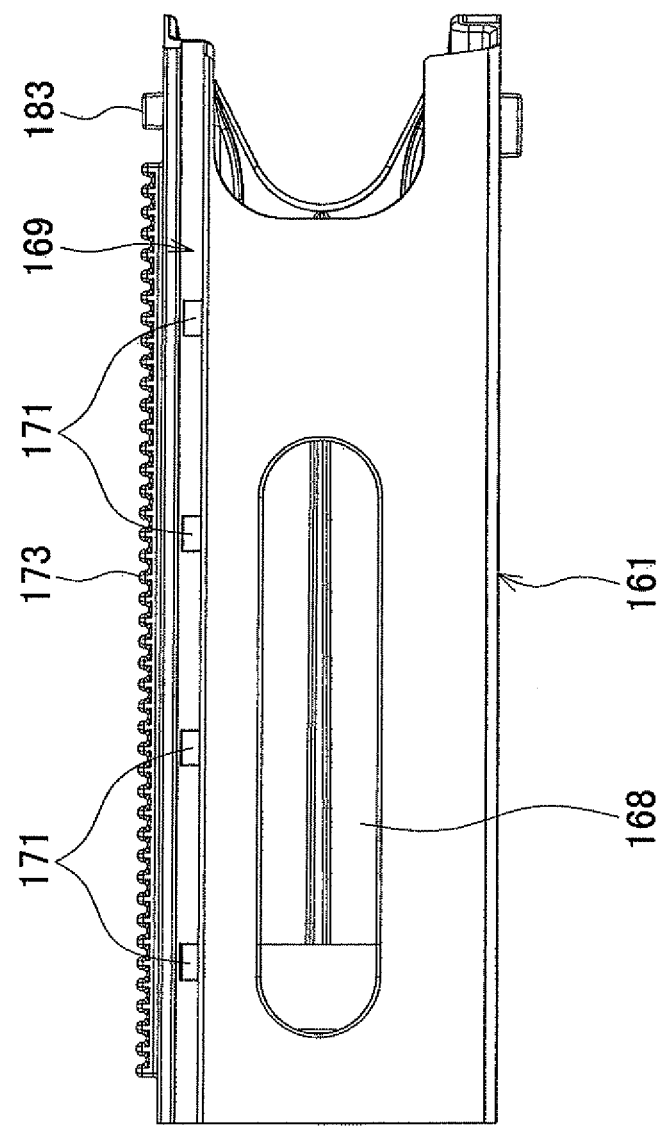
FIG. 13 is a back surface view of the main portion of the ventilation member in the second embodiment.

As shown in FIGS. 11 and 12, the base portion 164 of the first concave groove 163 has a plurality of rectangle-shaped first communication openings 167 that communicate the inside of the first concave groove 163 with the outside. Herein, each first communication opening 167 is formed to communicate the inside of the first concave groove 163 with the inside of the ventilation member 161. As shown in FIGS. 12 and 13, the base surface of the ventilation member 161 has an oval-shaped second communication opening 168 that communicates the inside of the ventilation member 161 with the outside.

As shown in FIGS. 12 and 13, in a lower portion on the right side of the ventilation member 161 when seen from the front, a second concave groove 169 is open on the lower side and extends in the front-rear direction. In a lower portion at the front end of the housing 131, as shown in FIG. 9, a second convex portion 170 that can contact the lower portion of the ventilation member 161 when seen from the front is provided to be directed upward. When the upper surface of the guide rail portion 162 of the ventilation member 161 is slid in the front-rear direction along the first convex portion 166, the lower portion on the right side of the ventilation member 161 when seen from the front is also guided in the front-rear direction along the second convex portion 170. In addition, the base surface of the ventilation member 161 has a plurality of rectangle-shaped third communication openings 171 (see FIG. 13) that communicate with the inside of the second concave groove 169. Each third communication opening 171 enables the inside of the ventilation member 161 to communicate with the outside. Each third communication opening 171 is arranged in a state where the position is displaced from the positions of each first communication opening 167 in the front-rear direction.

On the right side surface of the ventilation member 161 when seen from the front, as shown in FIGS. 7 and 9, a rack 173 that extends in the front-rear direction is formed. On the right side surface at the front end of the housing 131 when seen from the front, a guide portion 174 of a retaining member 175 for the ventilation member 161 is provided to protrude horizontally. On the guide portion 174, a guide hole 176 penetrates in the front-rear direction, and the rack 173 enters the guide hole 176 with free movability when the ventilation member 161 is slid in the front-rear direction. On the right side surface of the ventilation member 161 when seen from the front, as shown in FIGS. 11 and 12, an engagement convex portion 183 that protrudes horizontally is provided. When an elastic engagement piece (not shown) of the retaining member 175 engages with the engagement convex portion 183, a maximum protruding position of the ventilation member 161 to the front side is determined. Furthermore, on the right side surface of the ventilation member 161 when seen from the front, an adjustment member 184 capable of engaging with the rack 173 is provided in any position in the front-rear direction to be slidable in the front-rear direction of the rack 173. The adjustment member 184 is used for adjusting the depth of insertion of the bit 111 to a workpiece. In a normal state, an engagement claw portion (not shown) of the adjustment member 184 is biased downward by a coil spring, and a fitting convex portion (not shown) of the adjustment member 184 is fitted to the first concave groove 163 from above. When the engagement claw portion engages with the rack 173, the adjustment member 184 is brought to a locked state.

In addition, as shown in FIGS. 7 to 9, a nozzle 177 that is L-shaped when seen from the side is connected to the front end of the ventilation member 161, and a suction head 178 is connected to the front end of the nozzle 177. A flexible hose 179 (see FIG. 8) is accommodated inside the ventilation member 161, and the front end of the flexible hose 179 is connected to the nozzle 177. A cylindrical duct 180 is connected to the rear end of the flexible hose 179. The duct 180 is bent in a U-shape along the shape of the rear end of the guide passage 160. In conjunction with the ventilation member 161 sliding in the front-rear direction, the flexible hose 179 can be extended or compressed in the front-rear direction in a state where the front end and the rear end are connected to the nozzle 177 and the duct 180, respectively. Outlets 181 (see FIGS. 8 and 9) are open at the rear end of the duct 180, and the outlets 181 penetrate the partition member 133 to protrude into the joining portion 152. It should be noted that the flexible hose 179 is one example of a hose according to the present invention.

As shown in FIG. 8, the dust box 185 is detachably mounted to the joining portion 152. The dust box 185 includes a rectangular parallelepiped box body 186 and a lid body 187 that is joined at an opening of the box body 186 with a hinge. The lid body 187 has an entrance 188 on one end side in the up-down direction and an exit 189 on the other end side. In the dust box 185, a filter unit 190 is positioned to cover the exit opening 189, and is mounted such that a filter surface 192 of a paper filter 191 protrudes. In a state where the dust box 185 is mounted to the joining portion 152, the rear end of the duct 180 fits with the entrance 188 such that the outlets 181 protrude into the dust box 185, and the exit 189 faces the communication hole 154.

Next, the operation in which the dust collecting device 130 is mounted on the hammer drill 101 and dust generated from the workpiece is collected will be described. When the dust collecting device 130 is mounted on the hammer drill 101, the lower portion of the mounting portion 122 is aligned with the guide rails 157 of the housing 131. The mounting portion 122 is located above the rear portion of the housing 131. Then, the dust collecting device 130 is slid to the rear side such that the fitting concave portion 132 fits to the mounting portion 122 of the hammer drill 101 from the front. Accordingly, the press rail 156 of the dust collecting device 130 fits with the guide groove 124 of the mounting portion 122, and the convex rim 158 of the guide rail 157 fits with the joining groove of the mounting portion 122 to slide to the rear side. While the press rail 156 contacts the pressing piece 127 at this time, the inclined surface of the press rail 156 pushes the pressing piece 127 upward. Therefore, the connector 125 moves to the connecting position in which the shutter portion 126 withdraws upward such that the opening is located directly behind the socket 128. Then, the male terminal 155 of the dust collecting device 130 enters the body housing 102 of the hammer drill 101 from the opened socket 128. Further, when the mounting portion 122 is fitted with the fitting concave portion 132, the male terminal 155 is inserted into and electrically connected with the female terminal simultaneously.

Then, an operator slides the adjustment member 184 upward against the biasing force of the coil spring to release the engagement of the engagement claw portion to the rack 173. The fitting convex portion of the adjustment member 184 is slid along the first concave groove 163 and the depth of insertion of the bit 111 to the workpiece is adjusted. When the operator releases his or her hands from the adjustment member 184 after the adjustment has been finished, the adjustment member 184 is biased downward by the elastic force of the coil spring. As a result, the engagement claw portion is engaged with the rack 173, and the adjustment member 184 returns to the locked state.

Subsequently, when the operator performs the pressing operation of the switch lever 119 of the hammer drill 101 to turn the switch 118ON, the motor 104 is driven to rotate the intermediate shaft 105. By operating a switch knob 129 (see FIG. 7) provided to the side surface of the body housing 102 to slide the clutch 108 at this time, the mode of the hammer drill 101 can be selected as follows. By selecting a forward position for engagement with only the first gear 107, it is possible to select a drill mode in which the rotation of the tool holder 110 via the second gear 116 causes the bit 111 to rotate. By selecting a rearward position for engagement with only the boss sleeve 109, it is possible to select a hammer mode in which swinging of the arm 113 causes the piston cylinder 112 to reciprocate so that the striker 115 in conjunction therewith strikes the bit 111 via the impact bolt 114. By selecting an intermediate position for simultaneous engagement with the first gear 107 and the boss sleeve 109, it is possible to select a hammer drill mode in which rotation of the tool holder 110 and striking by the impact bolt 111 are performed simultaneously. When the hammer drill 101 moves forward in a state where the suction head 178 is in contact with a machining surface of the workpiece, the ventilation member 161 moves rearward until the adjustment member 184 contacts the guide portion 174, and the hammer drill 101 moves forward, and the bit 111 penetrates the suction head 178 so that the workpiece can be machined.

When the switch 118 is ON, the controller 123 supplies power to the controller 138 of the dust collecting device 130. The controller 138 drives the motor 136 to rotate the dust collecting fan 150. Accordingly, outside air sucked in from the suction head 178 passes through the flexible hose 179 in the ventilation member 161 and the duct 180, and is discharged into the dust box 185 from the outlets 181. The air discharged into the dust box 185 turns toward the front side of the filter unit 190 and passes through the filter 191 from the filter surface 192. The air that has passed through the filter 191 reaches the fan chamber 134 via the communication hole 154 from the exit 189, and is discharged outside the fan chamber 134 from an air discharge opening that communicates the fan chamber 134 and the outside of the dust collecting device 130. Therefore, dust generated from a part of the workpiece being machined by the bit 111 is sucked in together with outside air from the suction head 178 and enters the dust box 185. Then, the dust is captured by the filter 191 located on an air passage that reaches the air discharge opening from the suction head 178 through the flexible hose 179 and the duct 180.

When the hammer drill 101 equipped with the dust collecting device 130 is used in a place with a lot of dust, dust that has entered the first concave groove 163 may obstruct sliding of the adjustment member 184 in the front-rear direction. In this embodiment, in order to reduce such obstruction in the sliding, dust that has entered the first concave groove 163 can be discharged outside the first concave groove 163 from the first communication opening 167, as will be described below. When the adjustment member 184 is slid, dust that has entered the first concave groove 163 from an opening on the upper side is pushed and carried by the fitting convex portion of the adjustment member 184 fitted in the first concave groove 163. At the point when the fitting convex portion has reached a position nearest to the first communication opening 167 while the adjustment member 184 is slid, the dust pushed and carried by the fitting convex portion is discharged inside the ventilation member 161 from the first communication opening 167. Thus, it becomes less likely for dust to be stuck between the first concave groove 163 and the fitting convex portion of the adjustment member 184, and obstruction in the sliding of the adjustment member 184 can be reduced.

The dust discharged inside the ventilation member 161 from the first concave groove 163 is discharged outside the ventilation member 161 from the second communication opening 168 or the third communication opening 171 that is open at the base surface of the ventilation member 161. Thus, accumulation of dust inside the ventilation member 161 can be prevented. Moreover, even if dust has entered between the rack 173 and the guide hole 176, the dust can be prevented from being caught between the rack 173 and the guide hole 176 because a gap is provided between the rack 173 and the guide hole 176. As a result, obstruction in the movement of the rack 173 within the guide hole 176 due to dust while the ventilation member 161 is being slid can be reduced.

Furthermore, the gaps are provided between the inner wall surface of the button accommodating chamber 145 and a portion of the upper surface of the operation button 139 in which the ribs 140 do not protrude and between the inner wall surface and a portion of the lower surface of the operation button 139 in which the ribs 141 do not protrude, and therefore dust can be prevented from being caught between the operation button 139 and the inner wall surface. As a result, obstruction of the pressing operation of the operation button 139 due to dust can be reduced. The button accommodating chamber 145 has an opening (not shown) that communicates with the motor accommodating chamber 135. Thus, it is also possible to temporarily discharge dust that has entered the button accommodating chamber 145 from the gap between the inner wall surface of the button accommodating chamber 145 and the operation button 139 into the motor accommodating chamber 135 through the opening.

<Effect of this Embodiment>

With the dust collecting device 130 and the hammer drill 101 equipped with the dust collecting device 130 in this embodiment, dust that has entered the first concave groove 163 of the ventilation member 161 can be pushed and carried to the first communication opening 167 by the fitting convex portion of the adjustment member 184 to be discharged outside the first concave groove 163 from the first communication opening 167 when the adjustment member 184 slides along the first concave groove 163. Therefore, as a result of dust becoming less likely to be stuck between the adjustment member 184 and the first concave groove 163, obstruction in the sliding of the adjustment member 184 due to dust in the first concave groove 163 can be reduced.

Even in a case where dust has entered the first concave groove 163 that is open on the upper side, the dust that has entered the first concave groove 163 can be discharged outside the first concave groove 163 from the first communication opening 167 after being pushed and carried to the first communication opening 167 by the adjustment member 184 when the adjustment member 184 slides along the first concave groove 163.

Furthermore, the dust that has entered the first concave groove 163 can be discharged outside the ventilation member 161 from the second communication opening 168 of the ventilation member 161 after being discharged inside the ventilation member 161 from the first communication opening 167.

The present invention is not limited to the embodiments described above and may be carried out with an appropriate modification for a part of the configuration without departing from the gist of the invention. For example, unlike the embodiment described above, the first concave groove provided to the guide rail portion 162 of the ventilation member 161 may have a shape in which the upper side is blocked and the side surface of the guide rail portion 162 is open. In this case, the ventilation member 161 may have the adjustment member 184 that fits with the first concave groove from the side.

Also, unlike the embodiment described above, it may be such that the dust collecting fan is accommodated in the hammer drill 101 instead of being accommodated in the dust collecting device 130, and dust is collected with a filter arranged in the dust collecting device 130 on an air passage that reaches the dust collecting fan from the ventilation member 161. Furthermore, although an example of mounting the dust collecting device 130 to the hammer drill 101 has been shown in the embodiment described above, this is not limiting, and the present invention may be applied to a power tool such as an electric drill as long as a dust collecting device can be mounted.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A power tool dust collecting device, the dust collecting device comprising:
   a casing mountable to a power tool;
   a cylindrical suction head that is provided so as to protrude from the casing, allows a tip end tool of the power tool to penetrate while in contact with a workpiece surface, and is connected at a circumferential surface to the casing such that an axis is directed in a front-rear direction;
   a dust collecting path that is formed in the casing so that air is sucked in from the suction head and introduced into the casing;

a filter that is provided on the dust collecting path and capable of capturing dust sucked in together with the air;

a blocking ring that is provided on a front surface of the suction head and subject to elastic deformation upon contact with the workpiece surface for blockage between the suction head and the workpiece surface; and a ventilating portion that is formed in the blocking ring to ensure a flow of air into the suction head regardless of whether the elastic deformation has occurred.

2. The power tool dust collecting device according to claim 1, wherein the ventilating portion is a V-shaped slit that is formed in a radial direction of the blocking ring with an inner circumferential edge of the blocking ring as a starting end, such that a width decreases as a distance from the inner circumferential edge increases.

3. The power tool dust collecting device according to claim 1, wherein a rear surface of the suction head is an inclined surface that is formed such that a length in an axial direction of the suction head decreases as a distance from a connecting portion between the casing and the suction head increases.

4. The power tool dust collecting device according to claim 1, wherein the ventilating portion is provided so as to avoid a position directly below center of the suction head.

5. The power tool dust collecting device according to claim 1, wherein the blocking ring is provided to be detachable.

6. The power tool dust collecting device according to claim 2, wherein an outermost portion of the slit is formed in a half circle shape.

7. The power tool dust collecting device according to claim 1, wherein the ventilating portion is a plurality of through holes formed at predetermined intervals in a circumferential direction.

8. The power tool dust collecting device according to claim 1, wherein the ventilating portion is a plurality of cutouts formed at predetermined intervals in a circumferential direction.

9. The power tool dust collecting device according to claim 1, wherein a ventilation member is provided at a front end of the casing, the ventilation member protruding to the front, being capable of sliding in the front-rear direction, and having the suction head and a guide rail portion provided with a concave groove extending in the front-rear direction on a bottom surface of the concave groove, the ventilation member is provided with an adjustment member sliding in the front-rear direction along the concave groove and being capable of adjusting a position where the ventilation member moves rearward by locking at a certain sliding position, and a first communication opening for communicating the inside of the concave groove with the outside is provided at the bottom surface of the concave groove.

10. The power tool dust collecting device according to claim 9, wherein the ventilation member is provided with the concave groove that is open on an upper side.

11. The power tool dust collecting device according to claim 9, wherein a hose is accommodated inside the ventilation member, the hose letting air sucked through the suction head pass through the hose and being extended or compressed in the front-rear direction by sliding of the ventilation member in the front-rear direction, the first communication opening is formed to communicate with the inside of the ventilation member, and a second communication opening for communicating the inside with the outside of the ventilation member is provided at a bottom surface of the ventilation member.

12. A power tool equipped with a power tool dust collecting device according to claim 1.

13. The power tool dust collecting device according to claim 1, wherein an inner circumference of the blocking ring has a taper portion that is tapered toward the front and of which a front end is an opening smaller than an opening on a front side of the suction head and the ventilating portion is formed on the taper portion.

* * * * *